United States Patent
Bonnain et al.

(10) Patent No.: US 10,086,961 B2
(45) Date of Patent: Oct. 2, 2018

(54) PACKAGING MACHINE AND APPARATUS THEREFOR

(71) Applicant: WestRock Packaging Systems, LLC, Norcross, GA (US)

(72) Inventors: Jean-Christophe Bonnain, Chateauroux (FR); Pascal Martini, Le Poinconnet (FR)

(73) Assignee: WestRock Packaging Systems, LLC, Atlanta, GA (US)

(*) Notice: Subject to any disclaimer, the term of this patent is extended or adjusted under 35 U.S.C. 154(b) by 0 days.

(21) Appl. No.: 15/515,516

(22) PCT Filed: Sep. 25, 2015

(86) PCT No.: PCT/US2015/052274
§ 371 (c)(1),
(2) Date: Mar. 29, 2017

(87) PCT Pub. No.: WO2016/053788
PCT Pub. Date: Apr. 7, 2016

(65) Prior Publication Data
US 2017/0217612 A1    Aug. 3, 2017

Related U.S. Application Data

(60) Provisional application No. 62/057,556, filed on Sep. 30, 2014.

(51) Int. Cl.
B65B 21/04    (2006.01)
B65B 21/18    (2006.01)
(Continued)

(52) U.S. Cl.
CPC ............ B65B 21/04 (2013.01); B65B 21/183 (2013.01); B65B 35/36 (2013.01); B65B 35/44 (2013.01);
(Continued)

(58) Field of Classification Search
CPC .... B65G 47/841; B65G 47/842; B65G 47/90; B65B 21/04; B65B 35/50; B65B 35/36
(Continued)

(56) References Cited

U.S. PATENT DOCUMENTS 5,263,568 A * 11/1993 Francioni ............. B65G 47/846
198/419.2
5,375,395 A * 12/1994 Gmeiner .................. B65B 21/04
53/247
(Continued)

FOREIGN PATENT DOCUMENTS

DE            4329179 A1    3/1995
WO    WO 2011/127367 A1   10/2011

*Primary Examiner* — William R Harp
(74) *Attorney, Agent, or Firm* — WestRock Intellectual Property Group

(57) ABSTRACT

An apparatus for a packaging machine comprising; a first conveyor for conveying an input stream of articles, a second conveyor for conveying an output stream of articles, a guide path configured as a loop and one or more tools coupled to the guide path. Each tool comprises a tool head for engaging with one or more articles in the input stream. The tool head is operable to transfer the one or more articles from the first conveyor to the second conveyor. The one or more articles are placed upon the second conveyor in discrete groups having one or more tiers.

20 Claims, 12 Drawing Sheets

(51) Int. Cl.
*B65B 35/36* (2006.01)
*B65B 35/44* (2006.01)
*B65B 35/50* (2006.01)
*B65B 35/52* (2006.01)
*B65B 61/20* (2006.01)
*B65G 57/32* (2006.01)

(52) U.S. Cl.
CPC .............. *B65B 35/50* (2013.01); *B65B 35/52* (2013.01); *B65B 61/207* (2013.01); *B65G 57/32* (2013.01)

(58) Field of Classification Search
USPC ................................ 198/432, 575, 431, 426
See application file for complete search history.

(56) References Cited

U.S. PATENT DOCUMENTS

| | | | |
|---|---|---|---|
| 5,381,884 A * | 1/1995 | Spatafora | B65G 47/848 |
| | | | 198/430 |
| 8,322,514 B2 * | 12/2012 | Bonnain | B65B 21/06 |
| | | | 198/430 |
| 2005/0274091 A1 | 12/2005 | Bridier | |
| 2006/0108198 A1 * | 5/2006 | Guidetti | B65B 23/14 |
| | | | 198/431 |

* cited by examiner

PACKAGING MACHINE AND APPARATUS THEREFOR

CROSS-REFERENCE TO RELATED APPLICATIONS

This application is a National Phase application of PCT Application PCT/US2015/052274, filed Sep. 25, 2015, which claims the benefit of US Provisional Patent Application No. 62/057556, filed Sep. 30, 2014, which is incorporated herein by reference in its entirety.

TECHNICAL FIELD

The present disclosure relates to a packaging machine and an apparatus therefor more specifically, but not exclusively, to an apparatus which groups an input stream of articles and is capable of stacking discrete groups of articles in one or more layers.

BACKGROUND

In the field of packaging it is often required to provide consumers with a package comprising a plurality of primary product containers such as cans, bottles and the like, grouped together in a carton. Such packages are desirable for shipping and distribution, for customer use, and for the display of promotional information. For cost and environmental considerations, the cartons or carriers used in such packages need to be formed from as little material as possible and cause as little wastage in the materials from which they are formed as possible. Another consideration is the strength of the package and its suitability for holding and transporting large weights of articles.

It is desirable to provide a packaging machine to automatically package a plurality of primary product containers in a carton; it also desirable that the packaging machine makes efficient use of space within a conversion plant or other premises. It also desirable for the packaging machine to be readily adapted to package the primary product containers into a plurality of different cartons, wherein the number of primary product containers, and their respective arrangement, is dependent upon the configuration of the desired carton or carrier.

SUMMARY

The various embodiments of the present disclosure seek to overcome or at least mitigate against the shortcomings of the prior art and/or provide an improvement in the field of packaging.

According to a first aspect of the disclosure for which protection is sought, there is provided an apparatus for a packaging machine comprising a first conveyor for conveying an input stream of articles and a second conveyor for conveying an output stream of articles. The apparatus may comprise a guide path configured as a loop. One or more tools may be coupled to the guide path. Each tool may comprise a tool head for engaging with one or more articles in the input stream. The tool head is operable to transfer the one or more articles from the first conveyor to the second conveyor. The one or more articles may be placed upon the second conveyor in discrete groups having one or more tiers.

Advantageously, the packaging machine can assemble groups of articles A in multiple tiers from a single input conveyor. In this way all tiers of articles A in a discrete group of articles A originate from the same conveyor, this decreases the footprint of the packaging machine so as to reduce the space required in a packaging plant.

The apparatus is capable of performing multiple functions including; grouping and metering of articles, stacking of articles in multiple tiers, and placement of insert between tiers of articles.

According to a second aspect of the disclosure for which protection is sought, there is provided an apparatus for a packaging machine comprising a first conveyor for conveying an input stream of articles and a second conveyor for conveying an output stream of articles. The apparatus may comprise a guide path configured as a loop. One or more tools may be coupled to the guide path. Each tool may comprise a tool head for engaging with one or more articles in the input stream. The apparatus may be operated in either of two modes of operation. In a first mode the tool heads transfer the one or more articles from the first conveyor to the second conveyor. The tool heads place the one or more articles upon the second conveyor in discrete groups having a single tier. In a second mode the tool heads transfer the one or more articles from the first conveyor to the second conveyor. The tool heads place the one or more articles upon the second conveyor in discrete groups having two or more tiers.

In some embodiments, the discrete groups are metered at a predefined pitch.

Optionally, in the first mode the discrete groups are metered at a predefined first pitch.

Optionally, in the second mode the discrete groups are metered at a predefined second pitch.

Each tool may be independently driven about the guide path by a drive motor.

The guide path may be mounted over a portion of the first conveyor and a portion of the second conveyor.

In some embodiments, the guide path comprises a first working reach and a second working reach, the first working reach is disposed in part over the first conveyor, the second working reach is disposed in part over the second conveyor.

Optionally, each tool comprises a chassis coupled to the guide path.

Optionally, each tool head is movably mounted to the chassis.

Each tool head may be moveable vertically with respect to the first and second conveyors.

In some embodiments, the apparatus comprises one or more tools having a first tool head configured to place a discrete group of articles in a first tier on the second conveyor.

Optionally, the apparatus comprises one or more tools having a second tool head configured to place a discrete group of articles in a second tier upon the first tier.

Optionally, the apparatus comprises a third conveyor for conveying carton inserts, the one or more tools having the first tool heads and/or the one or more tools having the second tool heads are configured to simultaneously transfer an insert from the third conveyor and a discrete group of articles from the first conveyor to the second conveyor.

The tools having the second tool heads may be arranged in alternating arrangement with the tools having the first tool heads.

In some embodiments, two or more tools are consecutively arranged to form first tool groups and two or more tools are consecutively arranged to form second tool groups, and wherein the first tool groups are arranged in alternating arrangement with the second tool groups.

Optionally, the first tool groups comprise three tool heads and the second tool head groups comprise three tool heads.

Optionally, the tools of the first tool groups may comprise a different tool head to the tools of the second tool groups.

Optionally, the tools of the first tool groups and the tools of the second tool groups may comprise the same tool heads.

The first conveyor may be arranged so as to converge towards the second conveyor.

The first conveyor may be arranged with respect to the second conveyor so as to define an acute angle therebetween.

In some embodiments, the first conveyor is arranged so as to be co-linear with the second conveyor.

Optionally, the first conveyor is at a different elevation to the second conveyor.

Optionally, the first conveyor is at a higher elevation than the second conveyor.

In some embodiments, the guide path comprises a working reach and a return reach, the working reach being disposed in part over the first conveyor and in part over the second conveyor.

Optionally, the apparatus comprises a cam follower mounted to the tool head and a cam track, the cam track predefining the elevation of each tool head about the guide path.

In some embodiments, each tool comprises an actuator for adjusting the elevation of each tool head with respect to the first and second conveyors as the tool is driven about the guide path.

Optionally, the actuator comprises one or more components selected from the group comprising: a cylinder and piston; a hydraulic pump; a pneumatic pump; a worm and worm gear; an internal screw thread; an external screw thread; a rack and pinion; and an electric motor.

According to a third aspect of the disclosure for which protection is sought, there is provided a method of configuring articles to be packaged comprising conveying an input stream of articles to a handling station. Engaging one or more articles in the input stream and forming the one or more articles into a discrete group of articles having one or more tiers.

Optionally, the method comprises metering discrete groups of articles into a predefined pitch separation.

Optionally, the method comprises forming the one or more articles into a discrete group of articles having two or more tiers and placing an insert between a first tier and a second tier.

According to a fourth aspect of the disclosure for which protection is sought, there is provided a method of configuring articles to be packaged comprising:
conveying an input stream of articles to a handling station;
engaging a first group of one or more articles in the input stream;
forming the first group of one or more articles into a discrete group;
placing the first group of one or more articles in an output stream at a first location;
engaging a second group of one or more articles in the input stream;
selecting one of the actions from the following group:
placing the second group of one or more articles in the output stream at a second location, and
placing the second group of one or more articles upon first group of one or more articles in the first location;
executing the selected action.
Optionally, the method comprises:
placing the second group of one or more articles upon the first group of one or more articles in the first location; and
placing an insert between the first group of one or more articles and the second group of one or more articles.

Optionally, the method comprises:
forming discrete groups of articles having two or more tiers; and
placing an insert between a first tier and a second tier.

According to a fifth aspect of the disclosure for which protection is sought, there is provided a
method of configuring articles to be packaged comprising:
providing an apparatus; the apparatus comprising:
a first conveyor;
a second conveyor;
a guide path configured as a loop;
a plurality of tools coupled to the guide path;
wherein each tool comprises a tool head;
conveying an input stream of articles upon the first conveyor;
engaging one or more articles in the input stream with the tool head of each one of the plurality of tools;
placing the one or more articles upon the second conveyor to form discrete groups of articles having one or more tiers.

According to a sixth aspect of the disclosure for which protection is sought, there is provided a
method of configuring articles to be packaged comprising:
providing an apparatus; the apparatus comprising:
a first conveyor;
a second conveyor;
a guide path configured as a loop;
a plurality of tools coupled to the guide path;
wherein each tool comprises a tool head;
conveying an input stream of articles upon the first conveyor;
engaging a first group of one of more articles in the input stream with the tool head of a first one of the plurality of tools;
placing the first group of one or more articles upon the second conveyor at a first location;
engaging a second group of one or more articles in the input stream with the tool head of a second one of the plurality of tools; and either:
placing the second group of one or more articles upon the second conveyor at a second location; or
placing the second group of one or more articles upon first group of one or more articles at the first location.

According to a seventh aspect of the disclosure for which protection is sought, there is provided a controller configured to perform a method as described in the foregoing paragraphs.

According to an eighth aspect of the disclosure for which protection is sought, there is provided a computer programme for execution in a controller, the computer programme comprising instructions for performing a method as described in the foregoing paragraphs.

According to a ninth aspect of the disclosure for which protection is sought, there is provided a package comprising a carton and a group of one or more articles formed by the method described in the foregoing paragraphs.

Within the scope of this application it is intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Various embodiments of the disclosure will now be described with reference to the accompanying drawings, in which.

DETAILED DESCRIPTION OF EMBODIMENTS

Detailed descriptions of specific embodiments of packaging machines, apparatus and methods therefor are disclosed herein. It will be understood that the disclosed embodiments are merely examples of the way in which certain aspects of the disclosure can be implemented and do not represent an exhaustive list of all of the ways the disclosure may be embodied. As used herein, the word "exemplary" is used expansively to refer to embodiments that serve as illustrations, specimens, models, or patterns. Indeed, it will be understood that the packaging machines, apparatus and methods therefor described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the disclosure.

Figure 1:
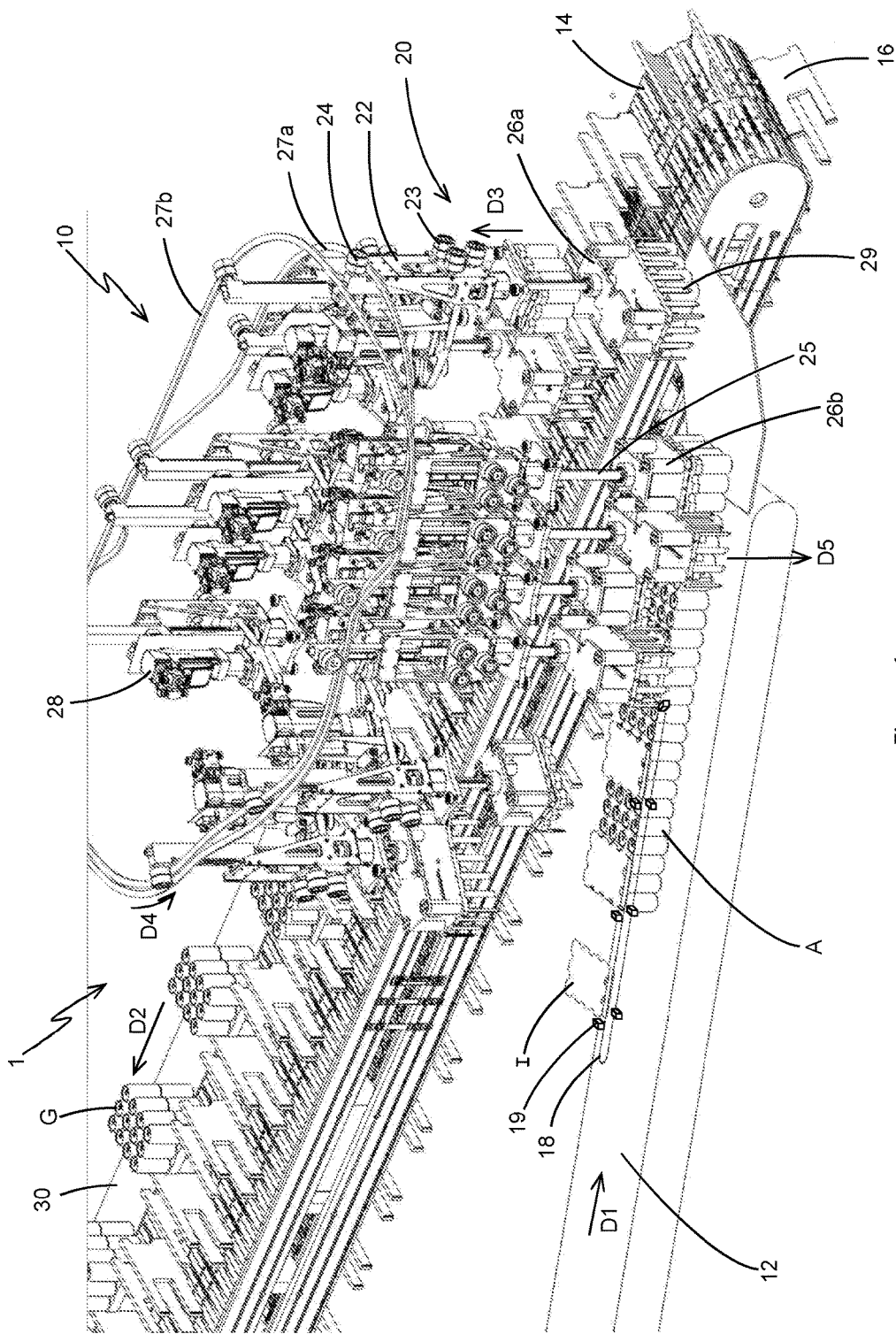
FIG. 1 is a perspective view from above of a packaging machine including an apparatus according to an embodiment of the present disclosure.

FIG. 1 shows a perspective view of a packaging machine 1 comprising an apparatus 10 adapted for packaging a group (one or more) of primary product containers such as, but not limited to, bottles, pouches, brick packs and cans, hereinafter referred to as articles A. The articles A are arranged by the packaging machine of FIG. 1 in preparation for being placed in a carton (not shown) at a subsequent processing station disposed downstream of the apparatus 10 shown in FIG. 1.

In the embodiments detailed herein, the terms "carton" and "carrier" refer, for the non-limiting purpose of illustrating the various features of the invention, to a container for engaging, carrying, and/or dispensing articles, such as product containers. It is contemplated that the teachings of the disclosure can be applied to various primary product containers, which may or may not be tapered and/or cylindrical. Suitable containers include bottles (for example metallic, glass or plastics bottles), cans (for example aluminum cans), sprayers or fluid dispensers such as perfume bottles, tins, pouches, packets, and the like. It will be appreciated that the carton may be employed, in some applications, to package primary products such as an alcoholic or non-alcoholic beverage held within the primary product containers. In other embodiments the primary products are for example, but without limitation, electrical goods or other items that may be packaged directly within the carton.

The inserts I shown in FIG. 1 and the blanks described herein are formed from a sheet of suitable substrate. It is to be understood that, as used herein, the term "suitable substrate" includes all manner of foldable sheet material such as paperboard, corrugated board, cardboard, plastic, combinations thereof, and the like. It should be recognized that one or other numbers of inserts or blanks may be employed, where suitable, for example, to provide the carton or package described in more detail below.

In various embodiments, the apparatus 10 is configured to package an illustrative arrangement of optional articles in cartons (not shown) or carriers (not shown) formed from blanks (not shown). The apparatus 10 is configured to arrange the articles A for packaging in cartons (not shown), carriers (not shown) or blanks (not shown) having a desired format. In one of the illustrated embodiments, the arrangement is two tiers each of twelve articles A configured in a 4×3 matrix or array, or a single tier of twelve articles A configured in a 4×3 matrix or array. In other embodiments, other arrangements may be employed. The blanks or cartons in which the articles are packaged may be configured to form cartons of any desired type or style; the number and size of the articles and/or their arrangement or configuration may be adjusted accordingly.

Referring again to FIG. 1, the packaging machine 1 comprises a first, input, conveyor 12. The input conveyor 12 conveys an input stream of articles A to a handling station. In the illustrated embodiment the input stream of articles A comprises four columns of articles. The four columns are conveyed in synchrony to the handling station. In other embodiments, the input stream of articles A may comprise up to 6 columns. In yet other embodiments more or less columns of articles A may be conveyed by the input conveyor 12.

An apparatus 10 is located at the handling station; the apparatus 10 comprises a plurality of tools 20 for handling the articles A in the input stream as they arrive. The apparatus 10 transfers groups of articles A from the input conveyor 12 to a second, output conveyor 14. The output conveyor 14 comprises a plurality of lugs 16, which define discrete locations in which the apparatus may place groups of articles A.

The input conveyor 12 conveys the input stream of articles A towards a first end of the output conveyor 14. The input conveyor 12 is divergently arranged with respect to the output conveyor 14. The input conveyor 12 and the output conveyor 14 diverge away from the apparatus 10. The input conveyor 12 may be arranged with respect to the output conveyor 14 so as to define an acute angle therebetween.

The packaging machine 1 comprises a fourth conveyor 30 which conveys discrete groups G of articles A to a further processing station (not shown). At the further processing station the grouped and metered articles G are packaged into a carton (not shown). A transfer device (not shown in FIGS.

1 to 9) transfers the discrete groups from the output conveyor 14 to the fourth conveyor 30.

The apparatus 10 is disposed above the input conveyor 12 and the output conveyor 14. A first portion of the apparatus 10 is disposed over the input conveyor 12 and a second portion is disposed over the output conveyor 14.

Figure 6:
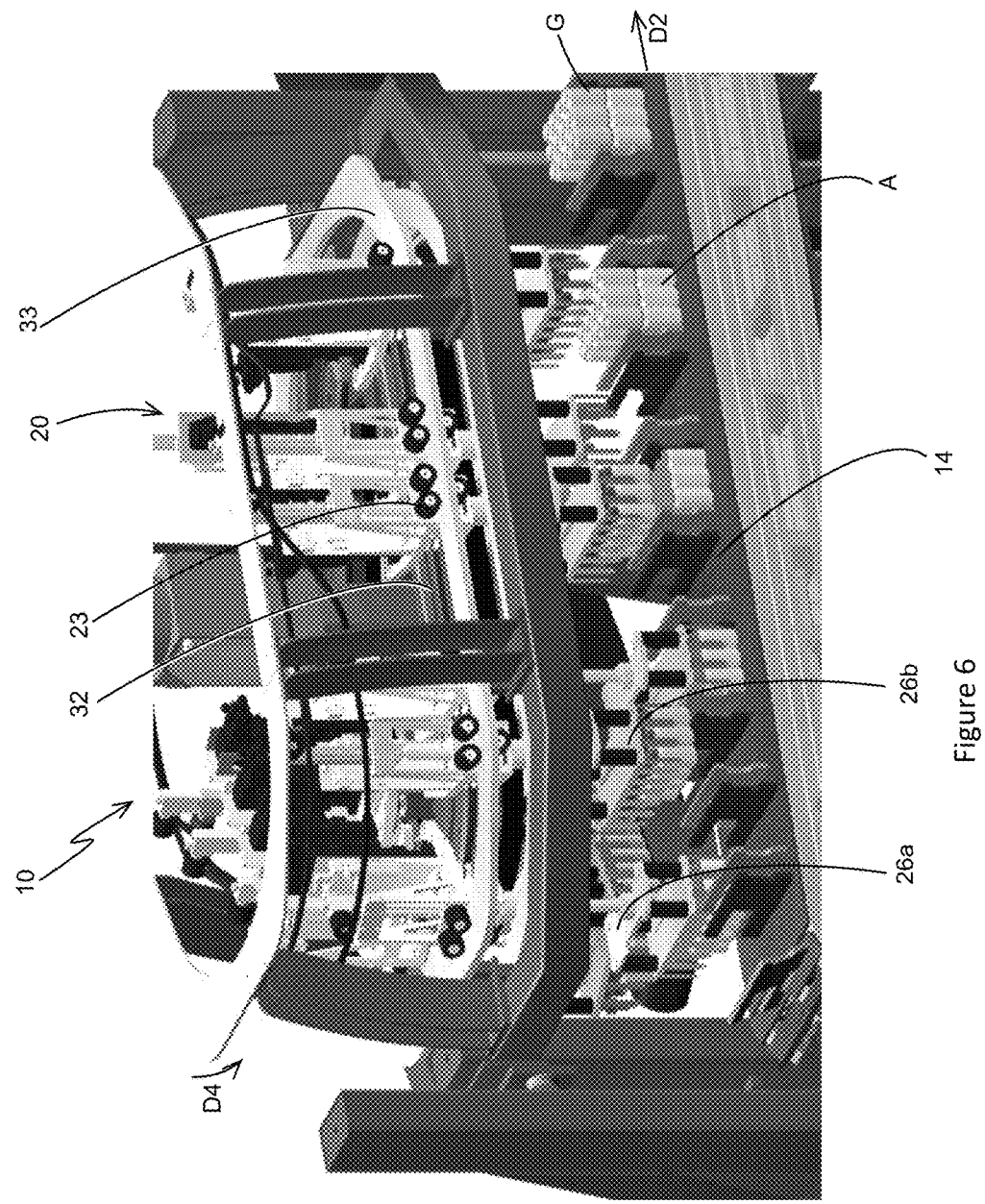
FIGS. 6 and 7 are additional perspective views from above of the packaging machine according to the first embodiment.
Figure 7:
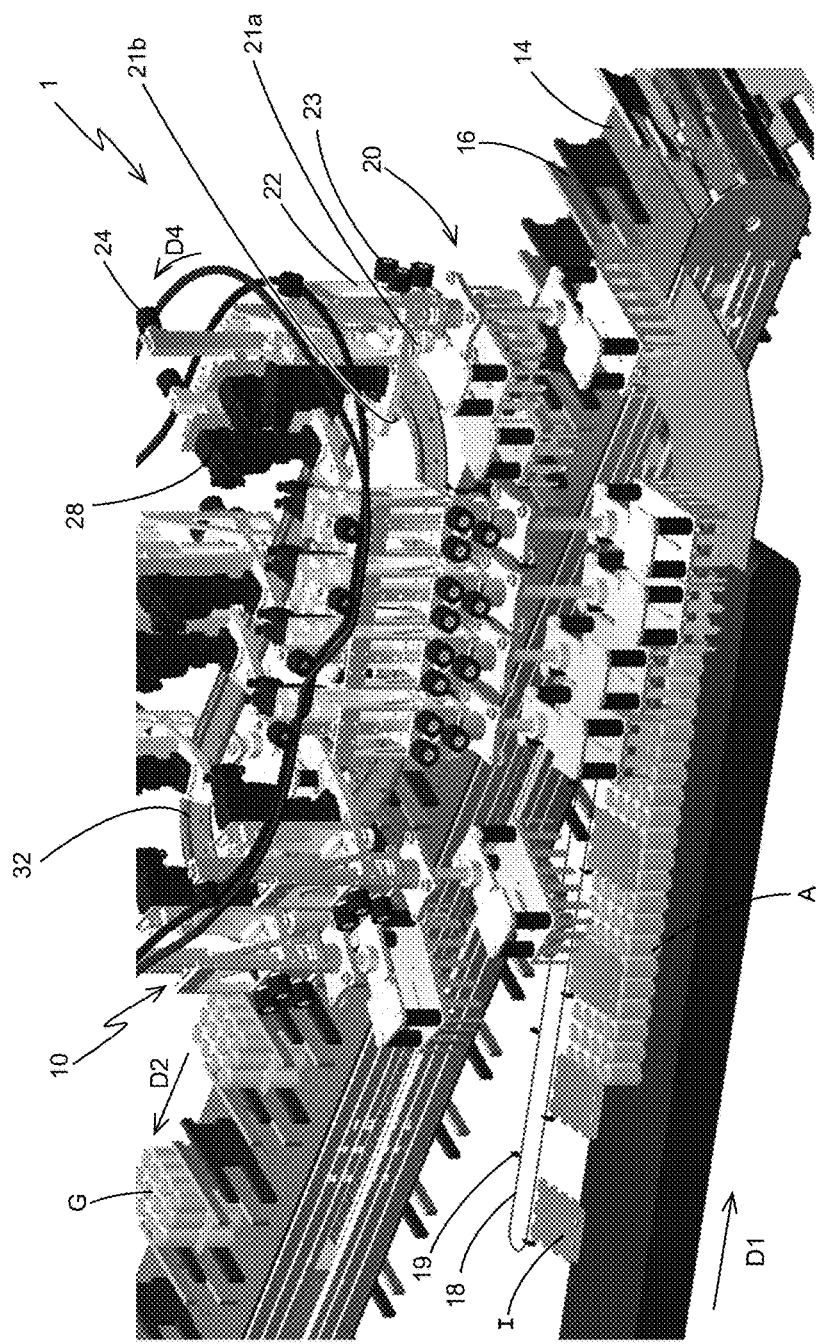

The apparatus 10 comprises a guide path 32 (see FIGS. 6 and 7) and a frame 33 to which the tools 20 are mounted. The tools 20 comprise a chassis 22. The tools 20 are coupled to the guide path 32 by idler wheels 21a, 21b which are rotationally mounted to the chassis 22 (see FIG. 7). The chassis 22 comprises a plurality of wheels 23 rotationally mounted thereto; each of the plurality of wheels 23 is mounted to the frame 33. A pair of wheels 23 is mounted upon the frame 33 and a single wheel 23 is disposed below the frame 33. Each of the tools 20 comprises a drive means 28 in the form of an electric motor, optionally a servo motor. The drive means 28 is coupled to a drive wheel (not visible). The drive wheel interacts or interfaces with the guide path 32, such that when the drive means 28 rotates the drive wheel, the tool 20 is propelled about the guide path 32. The drive wheel may be a gear wheel comprising teeth which interface with teeth provided on an edge of a recess in the upper surface of the guide path 32. In the illustrated embodiment the teeth are arranged on the guide path 32 so as to provide an internal gear or rack configured in a closed loop. The drive wheel is a pinion gear which moves about the internal gear or rack as it is rotated by the drive means 28. In this way the tools 20 are driven about an endless path defined by the guide path 32. Alternatively, the drive wheel may comprise a cylindrical surface which frictionally engages with a surface of the guide path 32.

In other embodiments, one of the plurality of wheels 23 or one of the idler wheels 21a, 21b may be coupled to the drive means 28 for propelling the tools 20 about the guide path 32 and/or frame 33.

The tools 20 each comprise a tool head 26a, 26b. The tool heads 26a, 26b are moveably mounted to the chassis 22.

The elevation of the tool heads 26a, 26b with respect to the first and second conveyors 12, 14 can be controlled and adjusted by movement of the tool heads 26a, 26b with respect to the chassis 22.

In the illustrated embodiments, the tool heads 26a, 26b are slidably mounted to the chassis 22 by a shaft 25 (see FIG. 1). A cam follower 24 is coupled to the tool heads 26a, 26b. The cam follower 24 is rotationally mounted to a first, upper, end of the shaft 25. A tool head 26a, 26b is mounted to a second, lower, end of the shaft 25. Each cam follower 24 is mounted on a cam path 27a, 27b. The apparatus 10 comprises two cam paths; a first cam path 27a and a second cam path 27b. The first cam path 27a controls a first group of tools 20 having a first tool head 26a, which are configured to transfer a first tier T1 of articles A to the output conveyor 14. The second cam path 27b controls a second group of tools 20 having a second head 26b which are configured to transfer a second tier T2 of articles A to the output conveyor 14. The cam follower 24 and cam paths 27a, 27b cooperate to adjust the elevation of the tool heads 26a, 26b as the tools 20 are driven about the guide path 32.

In some embodiments, the first tool heads 26a are configured to slide a group of articles A upon a transfer surface 9. The second tool heads 23b are configured to lift or pick up a group of articles A by an upper surface of each article A, for example, but not limited to, with a suction cup (not shown) coupled to a vacuum system (not shown).

In other embodiments, such as when forming discrete groups of articles A having a single tier all the tool heads 26a may be configured to slide a group of articles A upon a transfer surface 9.

In yet other embodiments, all the tool heads 26a may be configured to lift or pick up a group of articles A by an upper surface of each article A.

In some embodiments, all of the tool heads 26a, 26b may be configured either to slide a group of articles A upon a transfer surface 9 or to lift or pick up a group of articles A by an upper surface of each article A, a controller (not shown) determines whether a given tool head 26a, 26b should slide or lift a group or articles as required by the configuration of the packages being created.

Optionally, the tool heads 26a comprise a plurality of fingers 29 disposed about the periphery of the tool head 26a. The fingers 29 extend downwardly from the tool head 26a. The fingers 29 assist in stabilising the outermost articles A in each group of articles A as they are transferred from the input conveyor 12 to the output conveyor 14. The outermost articles A then stabilise the inner articles A.

Optionally, the tool heads 26a are configured to handle groups of articles arranged in matrices or arrays having up to 6 columns of articles and up to 3 rows of articles. The tools heads 26a, 26b may be employed to transfer between one and eighteen articles as desired. When handling less than eighteen articles A the tool heads 26a, 26b part of the tool heads 26a, 26b may be unoccupied by articles A. As illustrated in FIG. 1, the tool heads 26a, 26b are employed to transfer twelve articles A. The tool heads 26a, 26b transfer three rows of articles from and input stream having four columns.

The input conveyor 12 illustrated in FIG. 1 may convey up to six columns of articles A in other embodiments. In other embodiments the input conveyor may be configured to convey more or less columns of articles A; in such embodiments the tools heads 26a, 26b may be configured accordingly.

Optionally, the apparatus 10 comprises a third conveyor 18 for conveying carton inserts I. The third conveyor 18 is disposed above the input conveyor 12. The third conveyor 18 may comprise lugs 19 to engage with the inserts I so as to ensure alignment of each insert I with a group of articles A disposed therebelow. The third conveyor 18 is configured to convey each insert I in synchrony with the group of articles A disposed therebelow.

FIGS. 2 to 5 illustrate the apparatus 10 in a first mode of operation. In the first mode of operation the apparatus 10 forms discrete groups G of articles A, which groups G have first and second tiers T1, T2 of articles A. Each of the first, lower, tiers T1 of articles A is formed by one of the tools 20 having a first tool head 26a. Each of the tools 20a, 20a', 20a", having a first tool head 26a mounted thereto, is coupled to the first cam path 27a. Each of the second, upper, tiers T2 of articles A is formed by one of the tools 20 having a second tool head 26b. Each of the tools 20b, 20b', 20b", 20b''', having a second tool head 26b mounted thereto, is coupled to the second cam path 27b.

Figure 2:
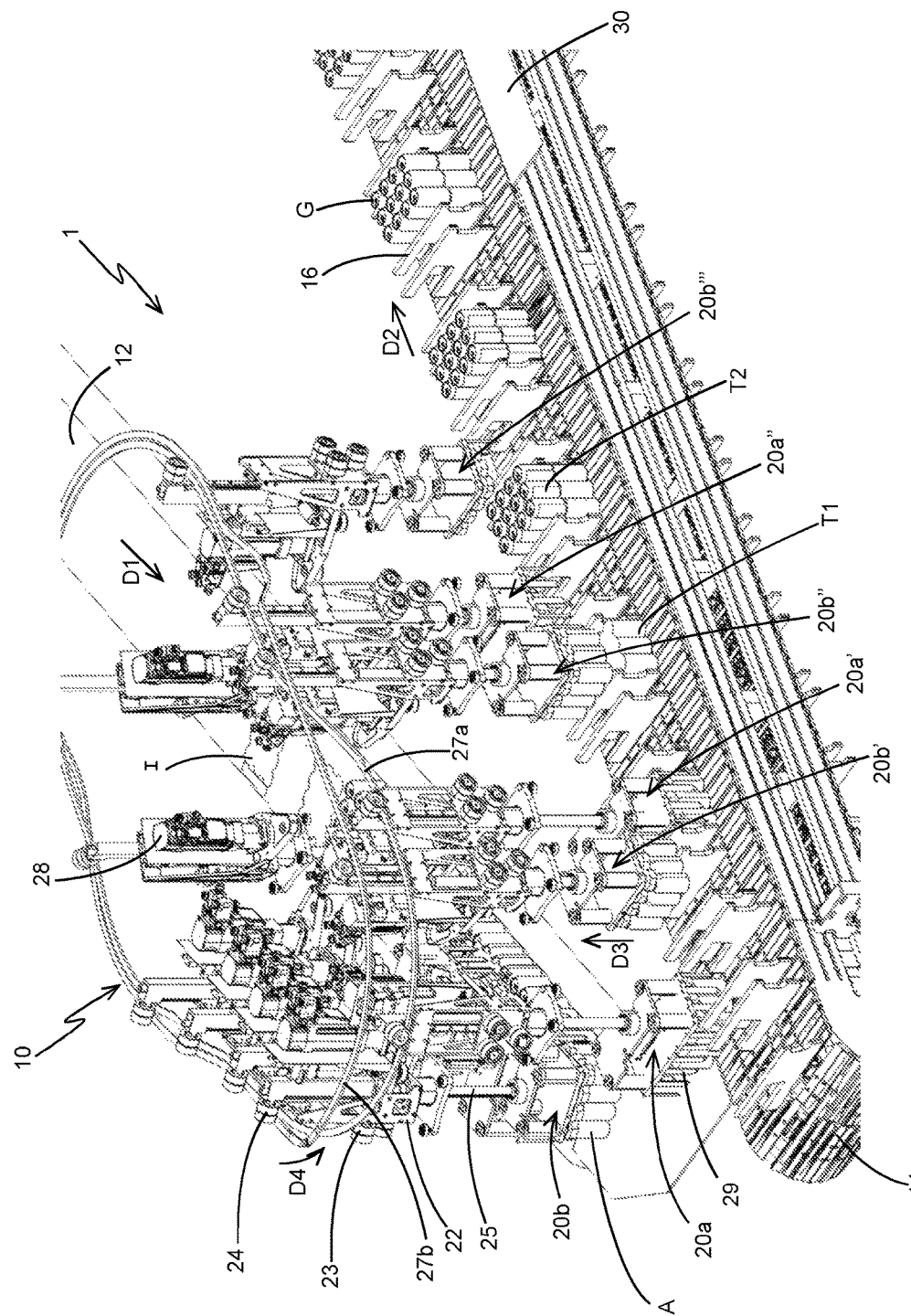
FIGS. 2 to 5 are alternative perspective views from above of the packaging machine and the apparatus of FIG. 1 in various stages of handling primary product containers in accordance with a first mode of operation.

In FIG. 2 a first tool 20b, having a second head 26b, is engaging with a first group of articles A as they reach the end of the input stream upon the input conveyor 12. A second tool 20a, having a first tool head 26a, is in the process of transferring a second group of articles A from the input conveyor 12 to the output conveyor 14.

In order to create discrete groups of articles A, the output conveyor 14 is operated at a higher speed than the input conveyor 12. In this way space can be created between each successive group of articles A. The groups of articles A are metered; that is to say, they are placed upon the output conveyor 14 at a predefined pitch or distance interval. Once the tools 20 have engaged with a group of articles A upon the input conveyor 12, the drive means 28 of each tool 20 accelerates the tool 20 such that it substantially matches the speed of the output conveyor 14, thus creating a space between each successive group of articles A.

In some embodiments, in which the apparatus 10 forms groups G of articles A having two or more tiers, it may not be necessary to operate the output conveyor 14 at a higher speed than the input conveyor 12, since a spacing between each successive group G of articles A can be created as a consequence of stacking the articles A in multiple tiers.

Once the tools 20 reach substantially the same speed as the output conveyor 14 the articles A are placed upon the output conveyor 14.

FIG. 2 shows a third tool 20a', having a first tool head 26a, depositing a third group of articles G in a first tier T1. A fourth tool 20b', having a second tool head 26b, is being accelerated with a fourth group of articles A so as to catch up with the third group of articles G deposited by the third tool head 26a'. A sixth tool 20b'', having a second tool head 26b, is placing a sixth group of articles A upon a fifth group of articles A. A fifth tool 20a'', having a first tool head 26a, has disengaged from the fifth group of articles A and is accelerating beyond the fifth group of articles A such that the sixth tool 20b'' can be brought into position over the fifth group of articles A. A seventh tool head 20b''', having a second tool head 26b, has disengaged from a seventh group of articles A disposed on the eighth group of articles A; the seventh tool 20b''' is moved away from the seventh and eighth groups of articles A and the output conveyor 14 as it follows the guide path 32. The seventh tool 20b''' will then be retarded or decelerated until it moves about the guide path 32 with a speed substantially similar to the speed of the input conveyor 12 in preparation to pick up another group of articles A therefrom.

Figure 3:
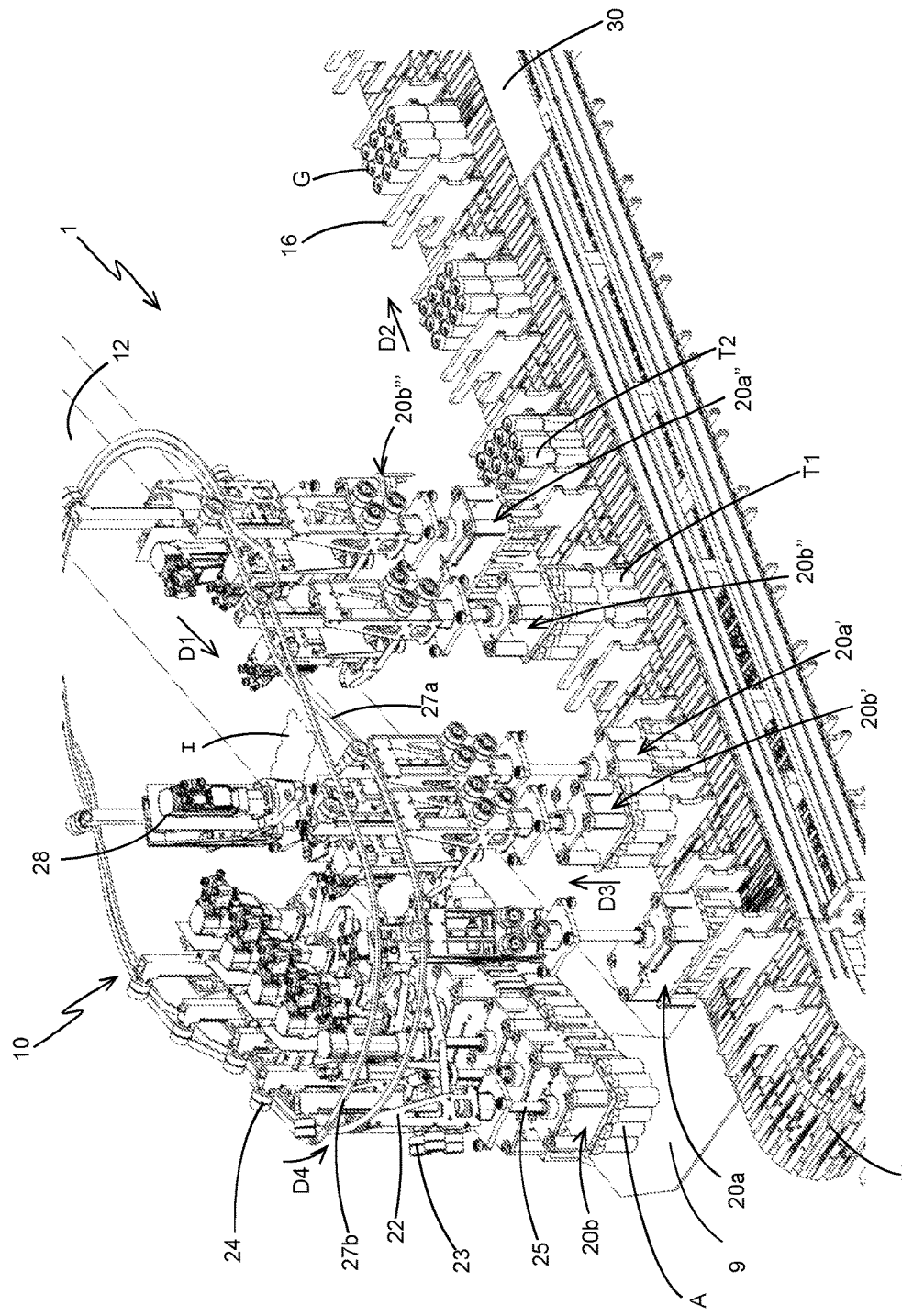

FIG. 3 shows the first tool 20b accelerating and elevating the first group of articles A once they are picked up. The second tool 20a is in the process of sliding the second group of articles A into a predefined pitch location on the output conveyor 14, between a pair of lugs 16.

The third tool 20a' is being elevated away from the third group of articles A. The fourth tool 20b' has reached a sufficient elevation such that the sixth group of articles A can be placed upon the fifth group of articles A.

The sixth tool 20b'' is lowering the sixth group of articles A upon the fifth group of articles A. The fifth tool 20a'' is being moved away from the sixth tool 20b''.

Figure 4:
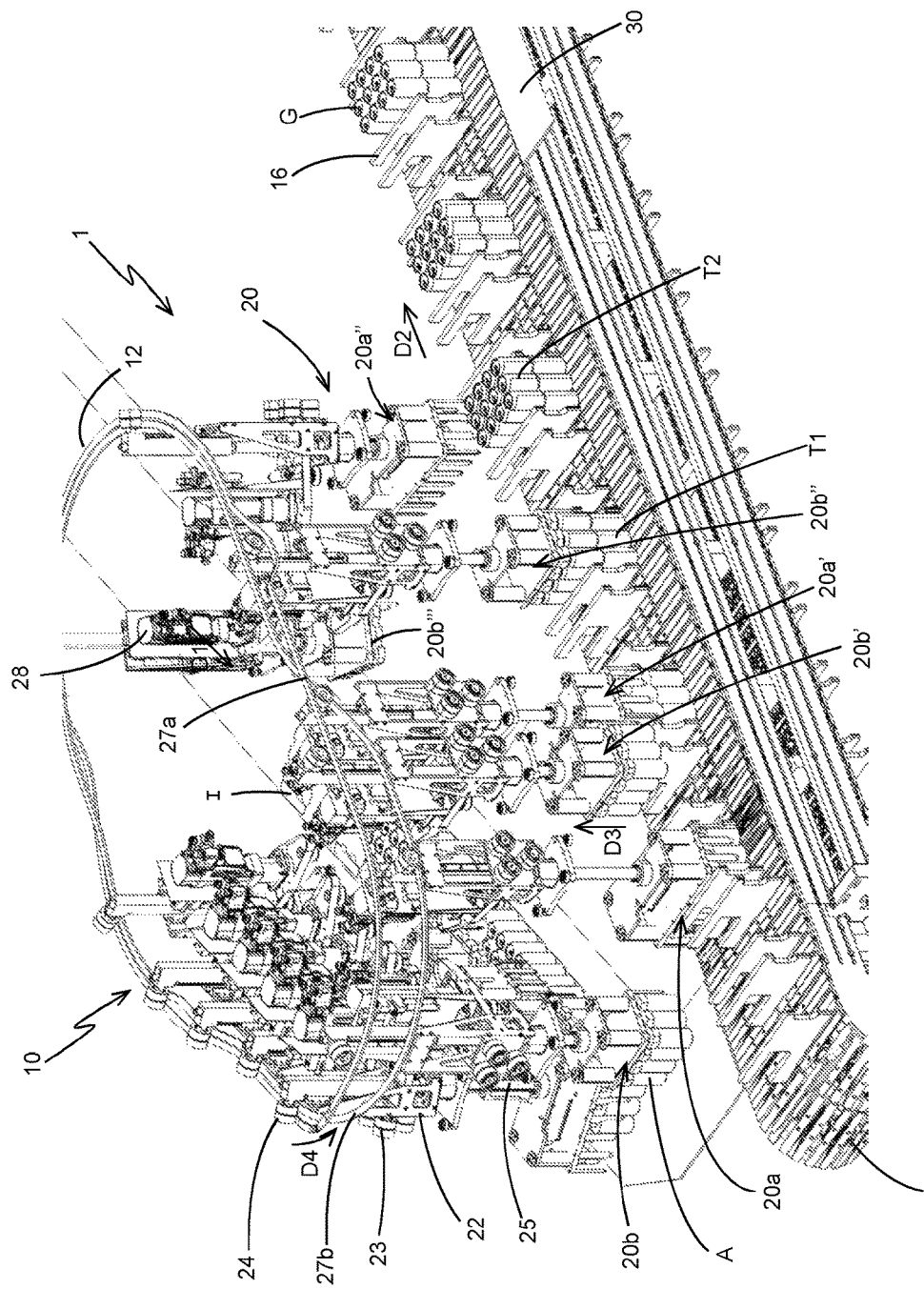

FIG. 4 shows the second tool 20a depositing the second group of articles A upon the output conveyor 14 and being elevated away therefrom. The first tool 20b is in the process of accelerating and elevating the first group of articles A to catch the second group of articles A.

The third tool 20a' has cleared the third group of articles A. The fourth tool 20b' is preparing to accelerate over the third group of articles A. The fifth tool 20a'' is being moved away from the fifth and sixth groups of articles A and the output conveyor 14 as it follows the guide path 32. The fifth tool 20a'' will then be retarded or decelerated until it moves about the guide path 32 with a speed substantially similar to the speed of the input conveyor 12 in preparation to pick up another group of articles A therefrom.

The sixth tool 20b'' has deposited the sixth group of articles A upon the fifth group of articles A. The sixth tool 20b'' is being elevated away from the sixth group of article A.

Figure 5:
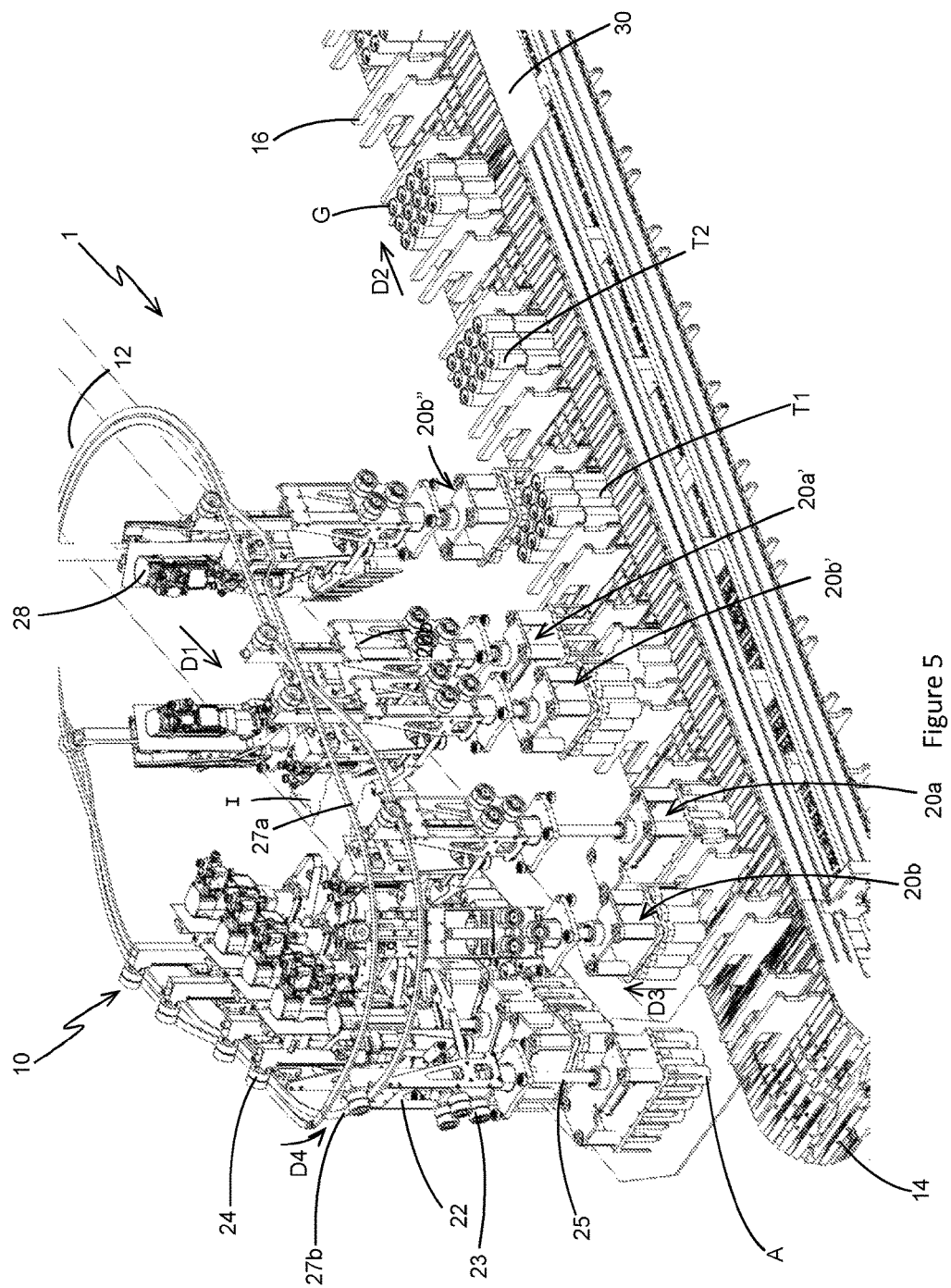

FIG. 5 shows the first tool 20b approaching or drawing close to the second tool 20a and the second group of articles A upon the output conveyor 14. The second tool 20a is in the process of elevating away from the second group of articles A.

The third tool 20a' is being moved away from the third group of articles A. The fourth tool 20b' is being moved over the third group of articles A. The sixth tool 20b'' is being moved away from the fifth and sixth groups of articles A and the output conveyor 14 as it follows the guide path 32. The sixth tool 20b'' will then be retarded or decelerated until it moves about the guide path 32 with a speed substantially similar to the speed of the input conveyor 12 in preparation to pick up another group of articles A therefrom.

Optionally, the tool heads 26a are configured to transfer an optional insert I from the third conveyor 18 simultaneously with the transfer of a group of articles A from the input conveyor 12 to the output conveyor 14. The insert I may be adapted to allow the tools head 26a to engage both the insert and a group of articles A. The insert I may comprise one or more recess disposed about the periphery of the insert I to allow the fingers 29 to engage with the articles A. The recesses facilitate alignment of the insert I with the group of articles A being engaged by the tool head 26a. The insert I may comprise one or more apertures configured to allow a respective one of the finger 29 to pass therethrough.

Figure 8:
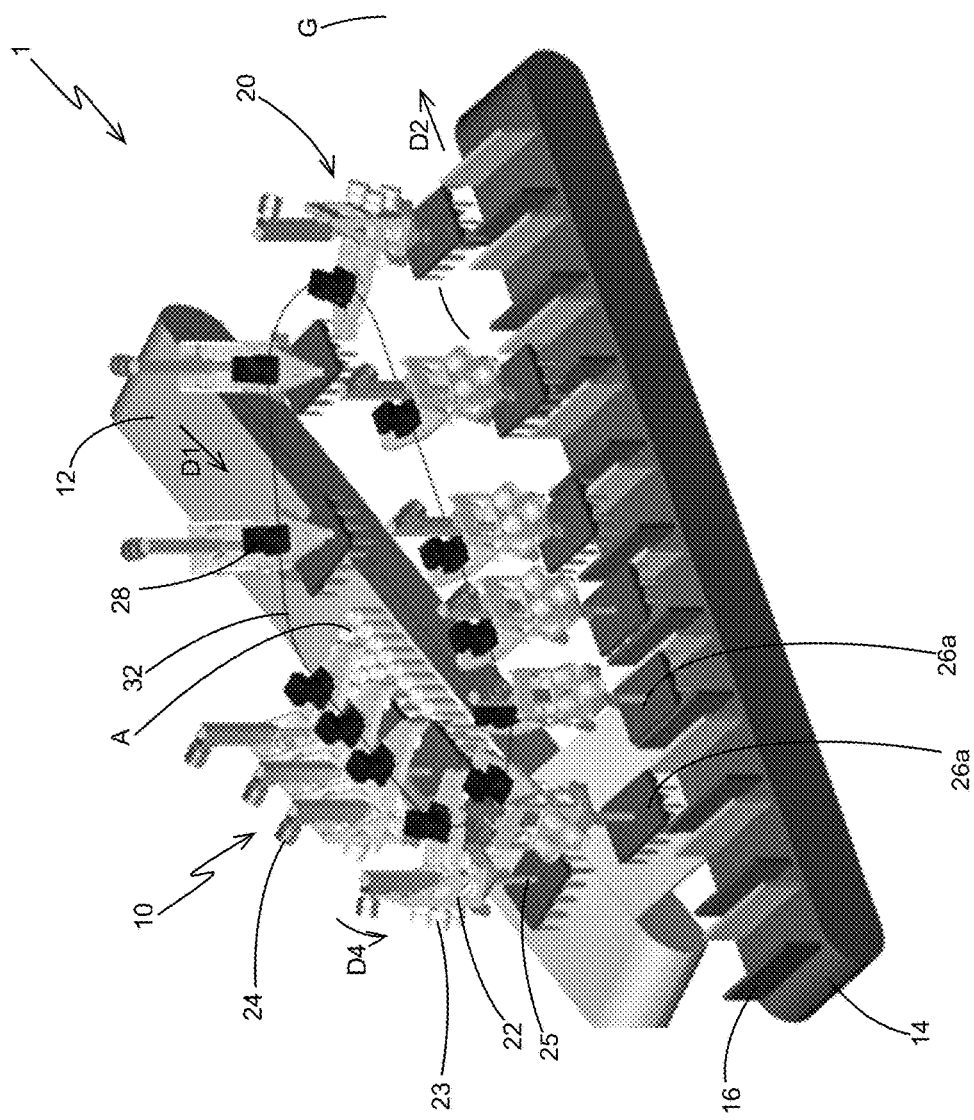
FIGS. 8 and 9 are perspective views from above of the packaging machine and the apparatus of FIG. 1 in various stages of handling primary product containers in accordance with a second mode of operation.
Figure 9:
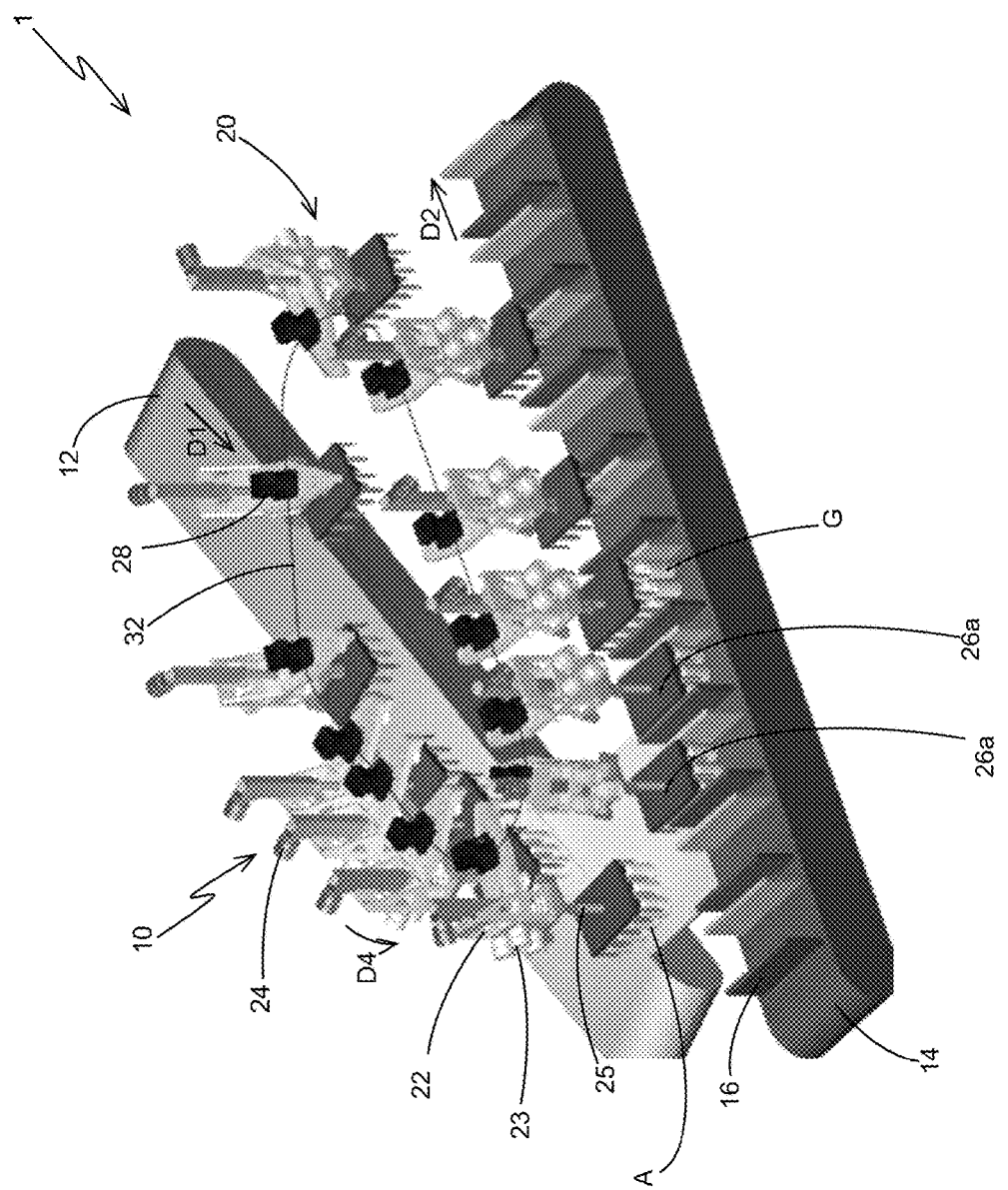

FIGS. 8 and 9 illustrate the apparatus 10 in a second mode of operation. In the second mode of operation the apparatus 10 forms discrete groups G of articles A which have a single tier of articles A. Each of the tools 20 is responsible for placing a group of articles A upon the output conveyor 14.

In order to create discrete groups of articles A, the output conveyor 14 is operated at a higher speed than the input conveyor 12. In this way space can be created between each successive group of articles A. The groups of articles A are metered; that is to say, they are placed upon the output conveyor 14 at a predefined pitch or distance interval. Once the tools 20 have engaged with a group of articles A upon the input conveyor 12, the drive means 28 of each tool 20 accelerates the tool 20 such that it substantially matches the speed of the output conveyor 14, thus creating a space between each successive group of articles A. The tools 20, once they have deposited a group of articles upon the output conveyor 14, are then retarded or decelerated until their speed substantially matches the speed of the input conveyor 12. In the second mode of operation all of the tools 20 are coupled to the first cam path 27a. In this way, the tools 20 place each group of articles directly upon the output conveyor 14. Whereas in the first mode of operation illustrated in FIGS. 1 to 7 alternate pitch locations were vacant, in the second mode of operation all of the predefined pitch locations on the output conveyor 14 are occupied by a group of articles A. The groups of articles A are spaced apart from one another to form discrete groups.

Figure 10:
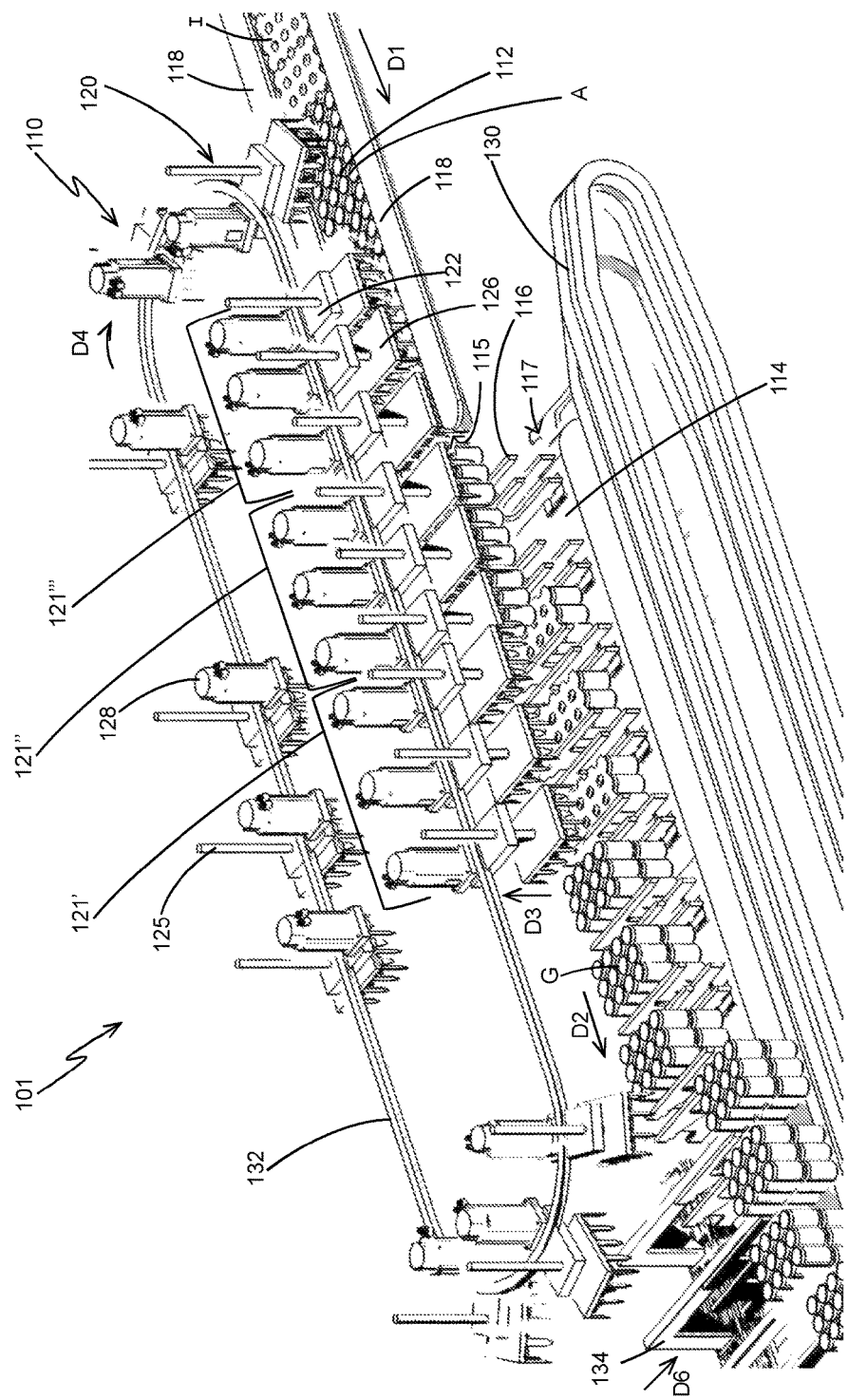
FIGS. 10 and 11 are perspective views from above of a packaging machine including an apparatus according to another embodiment of the present disclosure, the apparatus being operated in a second mode of operation.
Figure 11:
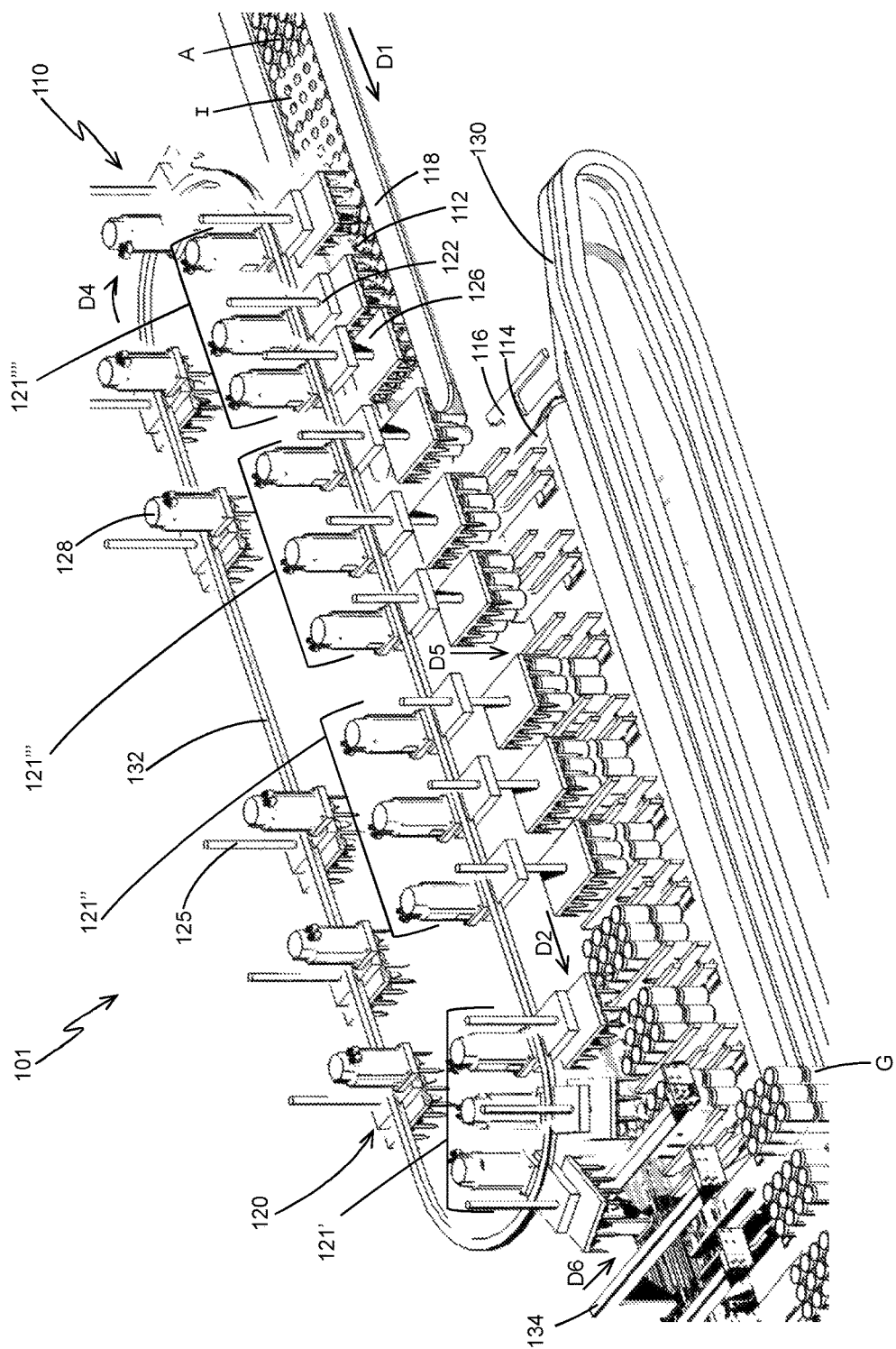

Referring now to FIGS. 10 and 11, there is shown an additional embodiment of the present disclosure. In the second illustrated embodiment like numerals have, where possible, been used to denote like parts, albeit with the addition of the prefix "100" to indicate that these features belong to the second embodiment. The additional embodiment shares many common features with the first embodiment and therefore only the differences from the embodiment illustrated in FIGS. 1 to 9 will be described in detail.

FIGS. 10 and 11 illustrate perspective views of a packaging machine 101 including an apparatus 110 according to a second embodiment. In the embodiment illustrated in FIGS. 10 and 11, the input conveyor 112 is arranged co-linearly with the output conveyor 114. The input conveyor 112 comprises a first, upstream end (not shown) and a second, downstream, end 115. The output conveyor 114 comprises a first, upstream end 117 and a second, downstream, end (not shown). The first, upstream, end 117 of the output conveyor 114 is adjacent to the second, downstream, end 115 of the input conveyor 112. The input conveyor 112 is disposed at a higher elevation than the output conveyor 114.

The apparatus 110 comprises a guide path 132 having a working reach and a return reach. The working reach of the guide path 132 is collinear with the input and output conveyors 112, 114. The apparatus 110 is disposed at a greater elevation than both the input and output conveyors 112, 114. The working reach of the guide path 132 is disposed above, and in vertical registry with, a portion of each of the input and output conveyors 112, 114.

Optionally, the apparatus 110 comprises a third conveyor 118 for conveying carton inserts I. The third conveyor 118 is disposed above the input conveyor 112. The third conveyor 118 may comprise lugs for engaging with the inserts I so as to ensure alignment of each insert I with a group of articles A disposed therebelow. The third conveyor 118 is configured to convey each insert I in synchrony with the group of articles A disposed therebelow. In the illustrated embodiment the inserts I are conveyed upon the third conveyor 118 in discrete groups of three inserts I. Each group of inserts I is spaced apart from the adjacent group of inserts I by a gap equivalent to a group of three inserts I.

The packaging machine 101 comprises a fourth conveyor 130 arranged adjacent to the output conveyor 114 and disposed parallel therewith. The packaging machine 101 comprises a transfer device 134 for transferring discrete groups of articles A from the output conveyor 114 to the fourth conveyor 130. The transfer device 134 slides one or more groups of articles A from the output conveyor 114 to the fourth conveyor 130. The transfer device 134 may be configured to move between an upstream position and a downstream position. In the upstream position the transfer device 134 engages with one or more groups of articles A as they are being conveyed upon the output conveyor 114. The transfer device 134 then moves downstream in synchrony with the one or more groups of articles A whilst simultaneously pushing the one or more groups of articles A in a direction D6 transverse to the direction of travel D2 of the grouped articles A upon the output conveyor 114. Once the one or more groups of articles A have been transferred to the fourth conveyor 130 the transfer device 134 returns to the starting upstream position in order to engage the next group of one or more groups of articles A.

The apparatus 110 comprises a plurality of tools 120 for handling the articles A in the input stream as they arrive at the second downstream end 115.

The apparatus 110 comprises a guide path 132 upon which the tools 120 are mounted. The tools 120 comprise a chassis 122. The tools 120 are coupled to the guide path 132 in a manner substantially similar to that described in relation to the embodiment of FIGS. 1 to 9.

The tools 120 are configured in tool groups 121', 121", 121''', 121'''' each having three tools 120. The tool groups 121', 121''' are configured to place a first, lower tier of articles A upon the output conveyor 114. The tool groups 121", 121'''' are configured to place a second, upper tier of articles A upon a respective first tier of articles A. The tool groups 121', 121''' are arranged in alternation with the tool groups 121", 121''''.

In FIG. 10 a first group 121' of tools 120 has deposited a first set of three groups of articles A in a first, lower, tier upon the output conveyor 114. A second group 121" of tools 120 has picked up a second set of three groups of articles A in preparation for placement upon the first set of three groups of articles A. Each group of articles A of the second set is placed upon a respective one of the first set of three groups of articles A; in this way, a discrete stacked group of articles A having a first tier and a second tier is formed. The discrete stacked groups of articles A are metered at a predefined pitch or separation. A third group 121''' of tools 120 is in the process of engaging with a third set comprising three groups of articles A which have arrived at the downstream end of the input conveyor 112.

In FIG. 11 the second group 121" of tools 120 is lowering the second set of three groups of articles A upon the first set of three groups of articles A. The third group 121''' of tools 120 is in the process of being moved onto the output conveyor 114 to form a first, lower, tier of articles A. A fourth group 121'''' of tools 120 is in the process of being brought into registry with a fourth set comprising three groups of articles A which are arriving at the downstream end of the input conveyor 112. The first group 121' of tools 120 is in the process of being moved to the upstream end of the output conveyor 114; the first group 121' of tools 120 is about to travel the return reach of the guide path 132.

The packaging machine 101 may be operated in the first mode illustrated in FIGS. 10 and 11 in which groups of articles A having two tiers of articles are formed. Alternatively, in a second mode of operation in which groups of articles A having a single tier of articles are formed, the output conveyor may need to be operated at a greater speed than when being operated in the first mode.

Figure 12:
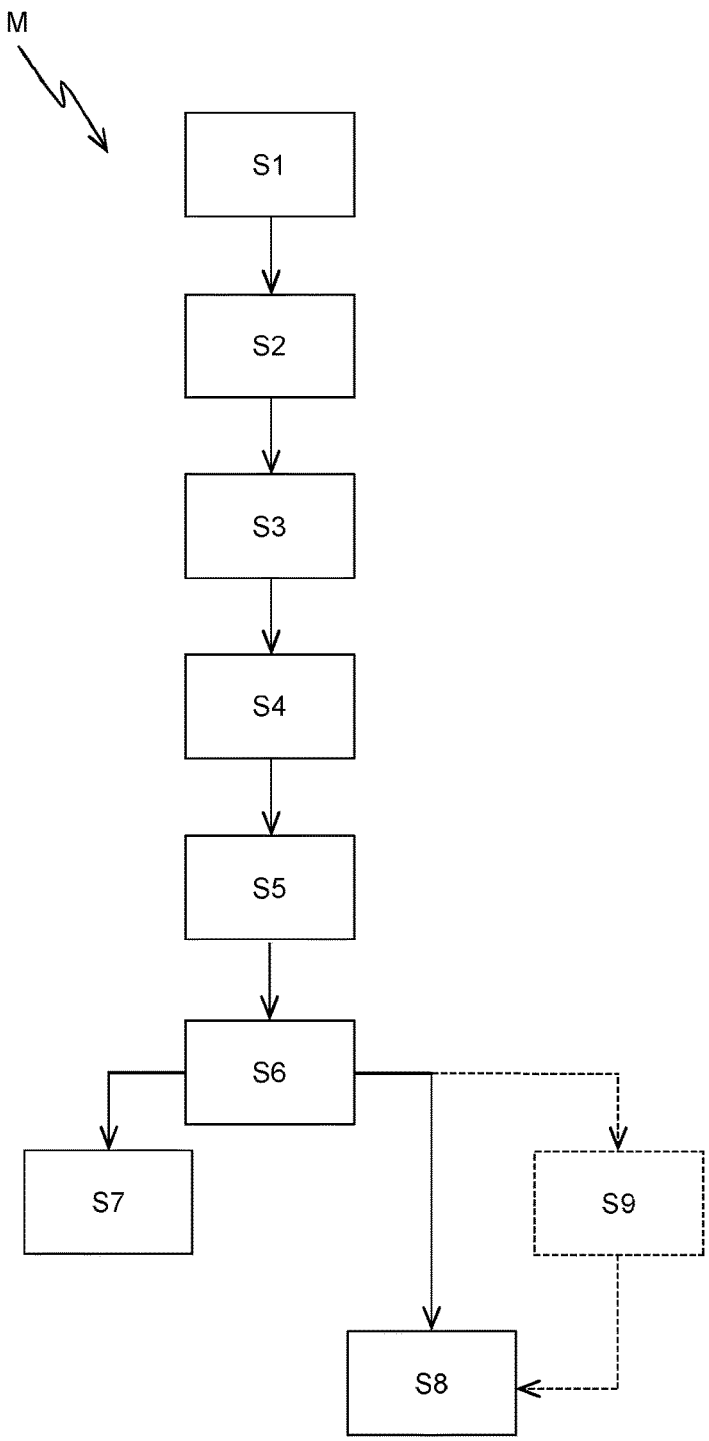
FIG. 12 is a flow chart illustrating a method of operation of the packaging machines illustrated in FIGS. 1 to 11.

The packaging machines of the illustrated embodiments may be operated according to the method as shown in FIG. 12:

S1—conveying an input stream of articles to a handling station.

S2—engaging a first group of one or more articles in the input stream.

S3—forming the first group of one or more articles into a discrete group.

S4—placing the first group of one or more articles in an output stream at a first location.

S5—engaging a second group of one or more articles in the input stream.

S6—selecting a desired article configuration:
either
S7—placing the second group of one or more articles in the output stream at a second location.
or
S8—placing the second group of one or more articles upon the first group of one or more articles in the first location.

S9—optionally placing an insert between the first group of one or more articles and the second group of one or more articles.

It can be appreciated that various changes may be made within the scope of the present invention. For example, the cam follower and cam track may be omitted; in alternative embodiments each tool may comprise an actuator for adjusting the elevation of each tool head with respect to the first and second conveyors as the tool is driven about the guide path. The actuator may comprise for example, but not limited to, one or more of the following: a cylinder and piston; a hydraulic pump; a pneumatic pump; a worm and worm gear; an internal screw thread; an external screw thread; a rack and pinion and an electric motor. The lugs 16, 116 may be adapted in height, depending upon the number of tiers of articles A being stacked in each group, such that they may at least partially engage with the uppermost tier of articles A.

The invention claimed is:

1. An apparatus for a packaging machine comprising: a first conveyor for conveying an input stream of articles; a second conveyor for conveying an output stream of articles; a guide path configured as a loop; one or more tools coupled to the guide path; wherein each tool comprises: a tool head for engaging with one or more articles in the input stream; the tool head being operable to transfer the one or more articles from the first conveyor to the second conveyor, the one or more articles being placed upon the second conveyor in discrete groups having two or more tiers, wherein the first conveyor is arranged so as to converge towards the second conveyor.

2. The apparatus according to claim 1, wherein the discrete groups are metered at a predefined pitch.

3. The apparatus according to claim 1, wherein each tool is independently driven about the guide path by a drive motor.

4. The apparatus according to claim 1, wherein the guide path is mounted over a portion of the first conveyor and a portion of the second conveyor.

5. The apparatus according to claim 1, wherein the guide path comprises a first working reach and a second working reach, the first working reach disposed in part over the first conveyor, the second working reach disposed in part over the second conveyor.

6. The apparatus according to claim 1, wherein the apparatus comprises one or more tools having a first tool head configured to place a metered group of articles in a first tier on the second conveyor.

7. The apparatus according to claim 6, wherein the apparatus comprises one or more tools having a second tool head configured to place a metered group of articles in a second tier upon the first tier.

8. The apparatus according to claim 7, wherein the apparatus comprises a third conveyor for conveying carton inserts, wherein the one or more tools having the first tool heads and/or the one or more tools having the second tool heads are configured to simultaneously transfer an insert from the third conveyor and a metered group of articles from the first conveyor to the second conveyor.

9. The apparatus according to claim 7, wherein the tools having the second tool heads are arranged in alternating arrangement with the tools having the first tool heads.

10. The apparatus according to claim 1, wherein the apparatus comprises a third conveyor for conveying carton inserts.

11. The apparatus according to claim 1, wherein two or more tools are consecutively arranged to form first tool groups and two or more tools are consecutively arranged to form second tool groups, and wherein the first tool groups are arranged in alternating arrangement with the second tool groups.

12. The apparatus according to claim 1, wherein the first conveyor is at a different elevation to the second conveyor and the guide path includes a working reach, the working reach being disposed in part over and collinear with the first conveyor and in part over the second conveyor.

13. An apparatus for a packaging machine comprising: a first conveyor for conveying an input stream of articles; a second conveyor for conveying an output stream of articles: a guide path configured as a loop, one or more tools coupled to the guide path; wherein each tool comprises: a tool head for engaging with one or more articles in the input stream; the apparatus comprising two modes of operation: a first mode in which the tool heads transfer the one or more articles from the first conveyor to the second conveyor, the tool heads placing the one or more articles upon the second conveyor in discrete groups having a single tier; a second mode in which the tool heads transfer the one or more articles from the first conveyor to the second conveyor, the tool heads placing the one or more articles upon the second conveyor in discrete groups having two or more tiers, wherein the first conveyor is at a different elevation relative to the second conveyor and the guide path includes a working reach, the working reach being disposed in part over and collinear with the first conveyor and in part over the second conveyor.

14. The apparatus according to claim 13, wherein in the first mode the discrete groups are metered at a predefined first pitch.

15. The apparatus according to claim 14, wherein in the second mode the discrete groups are metered at a predefined second pitch.

16. The apparatus according to claim 13, wherein the first conveyor is arranged so as to converge towards the second conveyor.

17. The apparatus according to claim 13, wherein the first conveyor is arranged so as to be co-linear with the second conveyor, with a downstream end of the first conveyor adjacent to an upstream end of the second conveyor.

18. The apparatus according to claim 13, wherein the guide path comprises a working reach and a return reach, the working reach being disposed in part over the first conveyor and in part over the second conveyor.

19. The apparatus according to claim 13, wherein each tool comprises an actuator for adjusting the elevation of each tool head with respect to the first and second conveyors as the tool is driven about the guide path.

20. A method of configuring articles to be packaged, then method comprising:
providing a first conveyor;
providing a second conveyor at a different elevation relative to the first conveyor;
providing a guide path configured as a loop;
providing a plurality of tools coupled to the guide path, wherein each tool includes a tool head;
conveying an input stream of articles upon the first conveyor;
engaging one or more articles in the input stream with the tool head of each one of the plurality of tools; and
placing the one or more articles upon the second conveyor to form discrete groups of articles having two or more tiers,
wherein the guide path includes a working reach, the working reach being disposed in part over and collinear with the first conveyor and in part over the second conveyor.

* * * * *